United States Patent [19]
Klötzig et al.

[11] Patent Number: 5,262,712
[45] Date of Patent: Nov. 16, 1993

[54] POWER SUPPLY SELECTIVELY PROVIDING SERIES AND PARALLEL REGULATION

[75] Inventors: Gerold Klötzig, Eching; Ernst Lingstaedt, Zorneding, both of Fed. Rep. of Germany

[73] Assignee: Eurosil Electronic GmbH, Eching, Fed. Rep. of Germany

[21] Appl. No.: 831,995

[22] Filed: Feb. 6, 1992

[30] Foreign Application Priority Data

Feb. 13, 1991 [DE] Fed. Rep. of Germany ....... 4104274

[51] Int. Cl.⁵ .............................................. G05F 1/613
[52] U.S. Cl. ...................................... 323/224; 323/226; 323/268; 323/280; 323/281
[58] Field of Search ............... 323/223, 224, 226, 265, 323/268, 273, 274, 280, 281, 299, 303

[56] References Cited

U.S. PATENT DOCUMENTS

| | | |
|---|---|---|
| 3,124,697 | 3/1964 | Trenchard . |
| 3,310,731 | 3/1967 | Ostroff et al. . |
| 3,464,036 | 8/1969 | Robinson et al. .................. 323/224 |
| 4,168,477 | 4/1979 | Burchall ............................ 323/224 |
| 4,232,261 | 11/1980 | Lingstaedt et al. ............... 323/275 |
| 4,352,054 | 9/1982 | Grunsch et al. ................... 323/224 |
| 4,459,537 | 7/1984 | McWhorter ....................... 323/224 |
| 4,584,517 | 4/1986 | Schwob ............................. 323/224 |
| 4,584,518 | 4/1986 | Higashino et al. ................ 323/224 |
| 4,812,736 | 3/1989 | Albach et al. ..................... 323/224 |
| 5,059,888 | 10/1991 | Van Tuijl ........................... 323/224 |

FOREIGN PATENT DOCUMENTS

| | | |
|---|---|---|
| 0392614 | 10/1990 | European Pat. Off. . |
| 2708021 | 8/1978 | Fed. Rep. of Germany . |
| 3622246 | 1/1987 | Fed. Rep. of Germany . |
| 3806771 | 9/1988 | Fed. Rep. of Germany . |

OTHER PUBLICATIONS

Elektronik Notizen, "Elektronik sogar im Schlüssel" Sep. 19, 1986, p. 12.

*Primary Examiner*—Jeffrey Sterrett
*Attorney, Agent, or Firm*—Spencer, Frank & Schneider

[57] ABSTRACT

The invention relates to a method and a circuit array for regulating the supply voltage of a load as may be found, for example, in the form of an integrated circuit in a chip card. An integrated circuit of this type contains a non-volatile memory and the control logic needed to read out the information stored in the non-volatile memory, but with the transmission of both energy and data being wireless, for example inductive. Data is transmitted by suitable modulation of the voltage supply. In order for the reader to clearly evaluate the read-out logic states, it is proposed in accordance with the invention that during output of the first logic level the supply voltage of the load is generated by serial regulation and that during output of the second logic level the terminal voltage of the voltage source is under parallel regulation.

17 Claims, 3 Drawing Sheets

POWER SUPPLY SELECTIVELY PROVIDING SERIES AND PARALLEL REGULATION

FIELD OF THE INVENTION

The invention relates to a method for regulating the supply voltage for a load to be fed from a voltage source, in particular for an IC card.

In recent years, so-called chip cards or IC cards have come into increasing use, these being understood as data carriers that extend from the familiar credit cards for cash dispensing machines, card telephones and other end units in communications technology, to identification cards for controlling access to sensitive-security zones.

DESCRIPTION OF THE PRIOR ART

The integrated circuit implanted in an IC card of this type contains a non-volatile memory and the control logic needed to read out the information stored in the non-volatile memory; generally however it does not have its own power supply.

With these systems, the power needed to read out the information is supplied by the reader unit that evaluates the stored information. This can be achieved by, for example, a direct galvanic connection to the reader, by which the required operating voltage is supplied and the connections necessary to process the stored information are made using several contact surfaces. In a system of this type, there are no strict requirements with regard to the current input from the supply voltage, since the latter comes directly from the reader. The reader too has no particular requirements to fulfill with regard to data transmission, since the transmitted information is made available with a sufficiently high signal level.

These advantages must however be set against the drawback that a mechanical connection is necessary to read out the information, so that the information carrier—for example an IC card—can only be inadequately protected against environmental effects, e.g. corrosion or static discharges. Furthermore, IC cards of this type are subjected in use to mechanical stresses, that can destroy in the galvanic connections between the implanted circuit and the connecting points on the card.

For this reason, wireless energy and data transmission is advantageous for many applications of a data carrier system as described above. This is—for example in the medical field—an essential requirement for implanted identification systems in view of the hermetically sealed packaging of the system.

The provision of the supply voltage and the data transmission itself can be inductive, for example, in a passive data carrier system of this type, i.e. in systems without their own power supply. FIG. 1 shows a system of this type in diagram form, with reference number 1 indicating a reader and 2 a passive data carrier system of the above type. Coils Sp1 and Sp2 are provided in the reader 1 and in the data carrier device 2 respectively for inductive coupling. The coil Sp2 in the data carrier device 2 forms, together with a diode D, a voltage source for the implanted circuit IC. Unlike a galvanic coupling, however, higher requirements are placed on the power input of the integrated circuit IC, since the transmitted power decreases very rapidly as the distance increases between the data carrier device 2 and the reader 1. On the other hand, the power emitted by the reader cannot be increased to whatever level is required in view of legal provisions. This gives rise to the requirement for the integrated circuit IC to be operational even with very low supply voltages and for the power input to be as low as possible here.

Since there is no direct connection for transmission of the data in a system of this type, data transmission must be achieved by suitable modulation of the voltage supply. In FIG. 1 for example, the coil Sp2 of the data carrier device 2, may be additionally loaded by switching a load resistor $R_L$ during readout from the integrated circuit IC of the information logic "1". By contrast, the coil Sp2 is only subjected to the quiescent current input of the integrated circuit IC during readout of the information logic "0". The loading by the load resistor $R_L$ should be as high as possible, so that the reader can evaluate the two states logic "1" and logic "0" clearly and with a low error rate. On the other hand, the loading by the load resistor $R_L$ must not be so heavy that the minimum supply voltage required by the integrated circuit is not achieved. In accordance with FIG. 1, the load resistor $R_L$ and a switch T are connected in parallel to the series circuit comprising the coil Sp2 and the diode D. The switch T designed as a MOS field-effect transistor is actuated by the integrated circuit IC in accordance with the information to be output, i.e. with an H level or with an L level.

SUMMARY OF THE INVENTION

The object of the invention is to provide a method of regulating the supply voltage for a load of the type previously mentioned which is designed as an integrated circuit to be fed from a voltage source, and with the load permitting wireless data transmission with the properties mentioned above. A further object is to provide a circuit array for implementation of this method in accordance with the invention.

The substance of the invention is that when one logic level is output, the supply voltage of the load is generated by serial regulation, as a result of which the load on the voltage source is minimized, and that when the other logic level is output, the terminal voltage of the voltage source is under parallel regulation, as a result of which as high as possible a load on this voltage source is achieved. Regulation therefore has the effect of modulating the terminal voltage of the voltage source as a function of the logic level output by the load. The terminal voltage is used both as the operating voltage and for data transmission.

In accordance with advantageous embodiments, the voltage value of the terminal voltage generated by parallel regulation is equal to or greater than the voltage value of the voltage generated by serial regulation. This can be achieved in a further advantageous embodiment of the method on the one hand in that the supply voltage of the load or the terminal voltage of the voltage source is adjusted to a reference voltage with both parallel and serial regulation, and on the other hand in that the supply voltage is adjusted to a first reference voltage and the terminal voltage to the sum of the voltage values of the first and a second reference voltage.

A circuit array for achieving the object of the invention includes a voltage source, a load, and a circuit means which connects the voltage source and the load and regulates the supply voltage on the load and the terminal voltage on the voltage source. The load is comprised of a circuit which emits a first logic level and a second logic level. The circuit means generates a supply voltage of the load by serial regulation during output of the first logic level and generates a terminal voltage of the voltage source by parallel regulation during output of the second logic level.

The circuit array, as shown in FIG. 2, is comprised of a first series circuit composed of the load and a serial regulator connected in parallel to the voltage source, and with the serial regulator being actuated by the output of a first differential amplifier. A first switch is connected in parallel with the serial regulator. The array also includes a second series circuit connected to the voltage source and composed of a parallel regulator and a second switch. The parallel regulator is actuated by the output of a second differential amplifier. Both switches are directly controlled by logic levels supplied by the load. A connecting circuit means connects at least one input of the first and second differential amplifiers to a reference voltage source. A circuit array of this type has a simple structure for implementation of the method in accordance with the invention.

Further advantageous embodiments of a circuit array of this type includes: a voltage source composed of the series connection of an AC voltage source and a diode; use of a second diode connected between the second switch and the AC voltage source to reduce noise as shown in FIGS. 4–5; use of a reference voltage source connected to at least one of the inputs of the first and second differential amplifiers to adjust the supply voltage of the load and the terminal voltage of the voltage source to correspond to the reference voltage as shown in FIGS. 2 and 4; use of two reference voltage sources in which one reference voltage source is connected to one input of both differential amplifiers set the supply voltage on the load to the first reference voltage and a further reference voltage source is connected to the other input of the second differential amplifier to set the terminal voltage on the voltage source to the sum of the two reference voltages as shown in FIGS. 3 and 5. Finally, the load circuit can be constructed using integrated CMOS technology and the serial and parallel regulators and the switches can be constructed of n-channel MOS field-effect transistors.

The method in accordance with the invention is described and explained on the basis of an embodiment of a circuit array for implementation of this method, in connection with the Figures.

In these Figures, components and assemblies with the same function have been given the same reference codes.

DESCRIPTION OF THE PREFERRED EMBODIMENT

Figure 1:
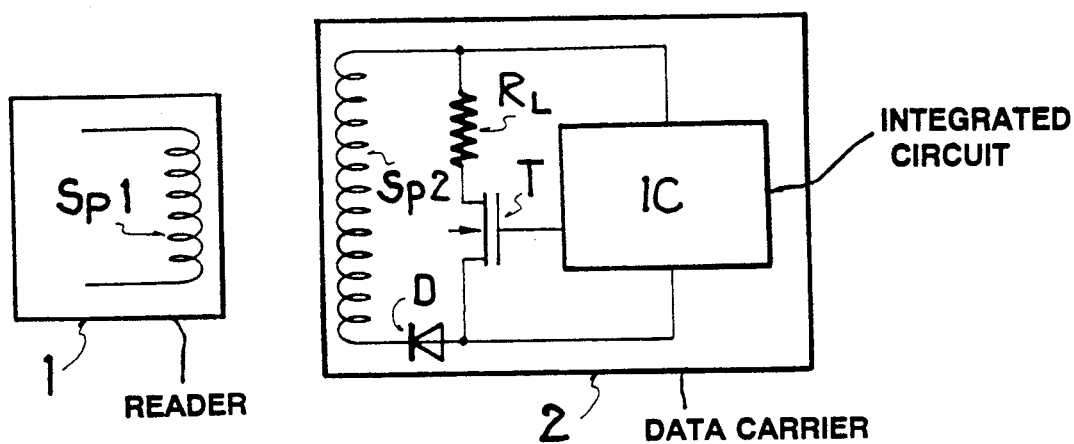
FIG. 1 shows the prior art: IC card or data carrier and IC card reader.
Figure 2:
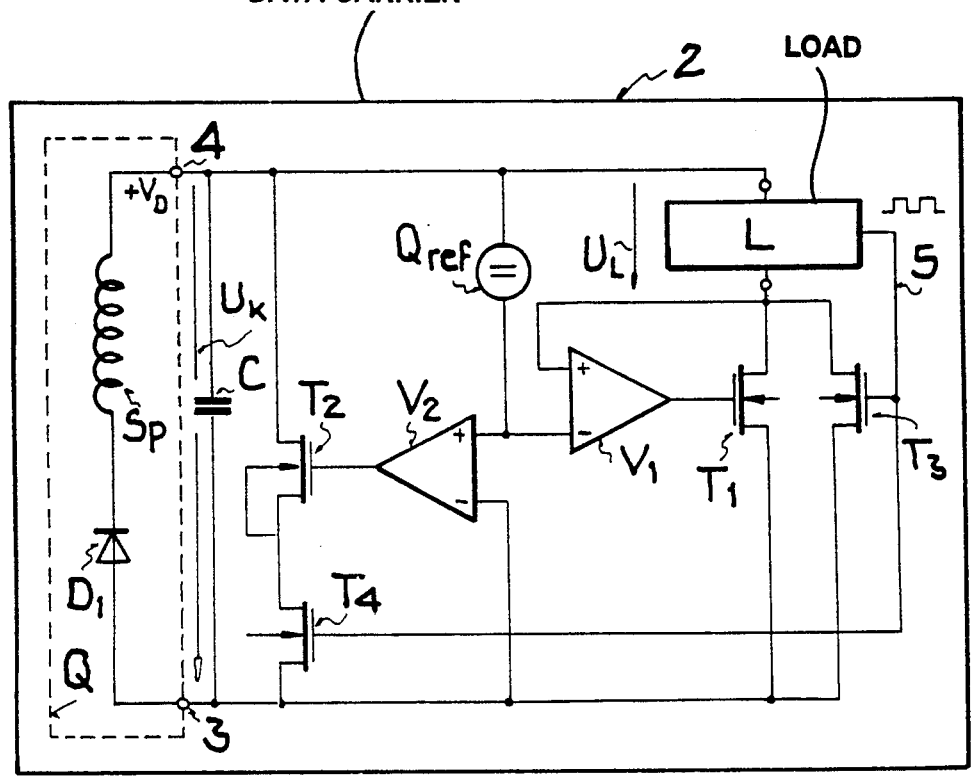
FIG. 2 is a circuit diagram of an embodiment of the circuit array for implementation of the method in accordance with the invention.

FIG. 2 shows a circuit array in accordance with the invention that is implemented together with the load L designed as an integrated circuit in a data carrier 2. The latter can be, for example, an IC card or a passive identification device. In accordance with FIG. 2, a coil Sp and a diode D1 are connected in series to form a voltage source Q, with a terminal volta U being applied to connecting points 3 and 4. The terminal voltage $U_K$ is induced in said coil Sp by inductive coupling with a reader and is rectified by the diode D1. A smoothing capacitor C is connected in parallel to the voltage source Q via the terminals 3 and 4. The series circuit consisting of load L and a serial regulator T1 designed as a MOS field-effect transistor is connected to the voltage source Q using the connections 3 and 4 on said voltage source. A first differential amplifier V1 controls via its output the serial regulator T1, with the non-inverting input of said differential amplifier V1 being connected to the serial regulator T1 at the connecting point of the load L. The inverting input of this first differential amplifier V1 is connected to the non-inverting input of a second differential amplifier V2, this connecting line being connected to the connection 4 of the voltage source Q via a reference voltage source $Q_{ref}$. The inverting input of this second differential amplifier V2 is by contrast connected to the other connection 3 of the voltage source. The switching path of a first switch T3 designed as a MOS field-effect transistor bridges the serial regulator T1. Finally, a series circuit comprising a parallel regulator T2 and a second switch T4 is connected in parallel to the voltage source Q via the terminals 3 and 4. The parallel regulator TQ designed as a MOS field-effect transistor is actuated via the output of the second differential amplifier V2. The substrate connection of this field-effect transistor is also at the source potential of the latter. The second switch T4 also represents a MOS field-effect transistor. The gate electrodes of the two switches T3 and T4 are connected and are actuated by the load L, which emits one of two possible logic levels to a line 5. If, for example, a Lo level is output on line 5, the two switches T3 and T4 are set to the blocked state. This switches the parallel regulator T2 off, while the serial regulator T1 is actuated by the differential amplifier V1 in such a way that the supply voltage $U_L$ applied to the load corresponds to the reference voltage $U_{ref}$ of the reference voltage source $Q_{ref}$. As a result, the voltage source Q is only loaded with the quiescent current input of load L. By contrast, a Hi level on line 5 has the effect of setting the two switches T3 and T4 to the conducting state, as a result of which the load L is switched parallel to the voltage source Q with the connections 3 and 4. Now, however, the parallel regulator T2 becomes active and is actuated such that the terminal voltage $U_K$ of the voltage source Q reaches the reference voltage $U_{ref}$ of the reference voltage source $Q_{ref}$. As a result, the voltage source is loaded not only with the quiescent current of the load, but additionally with the current caused by the parallel regulator T2, with the load L nevertheless receiving the minimum supply voltage $U_L$ necessary for dependable operation. The voltage source Q is thus loaded as heavily as possible in order to obtain a dependably recognizable criterion for the transmission of data.

Figure 3:
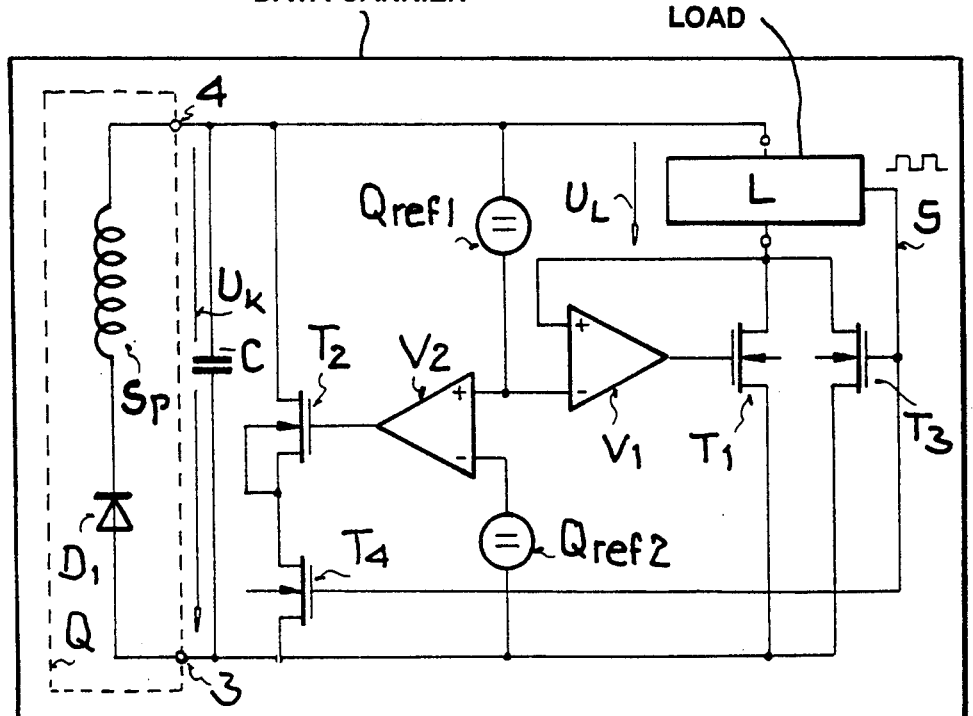
FIG. 3 is a circuit diagram of a second embodiment of the circuit array for implementation of the method in accordance with the invention.

The circuit according to FIG. 3 differs from that shown in FIG. 2 only in that a second reference voltage source $Q_{ref2}$ is provided in addition to the first reference voltage source $Q_{ref1}$. This second reference voltage source $Q_{ref2}$ connects the inverting input of the second differential amplifier V2 to the connection 3 of the voltage source Q. The function of this circuit is changed to the extent that when the load L outputs the Hi level, the terminal voltage $U_K$ is adjusted to the sum of the reference voltages $U_{ref1}$ and $U_{ref2}$ of the two reference voltage sources. The reference voltage of the second reference voltage source $Q_{ref2}$ is selected here such that the sum of the two reference voltages is only slightly higher than the required supply voltage $U_L$ of the load. For example, the value of this second reference voltage $U_{ref2}$ can be selected to correspond to the voltage drop at the conducting first switch T3. As a result, the connected load L continues to receive the supply voltage $U_L$ necessary for dependable operation.

Figure 4:
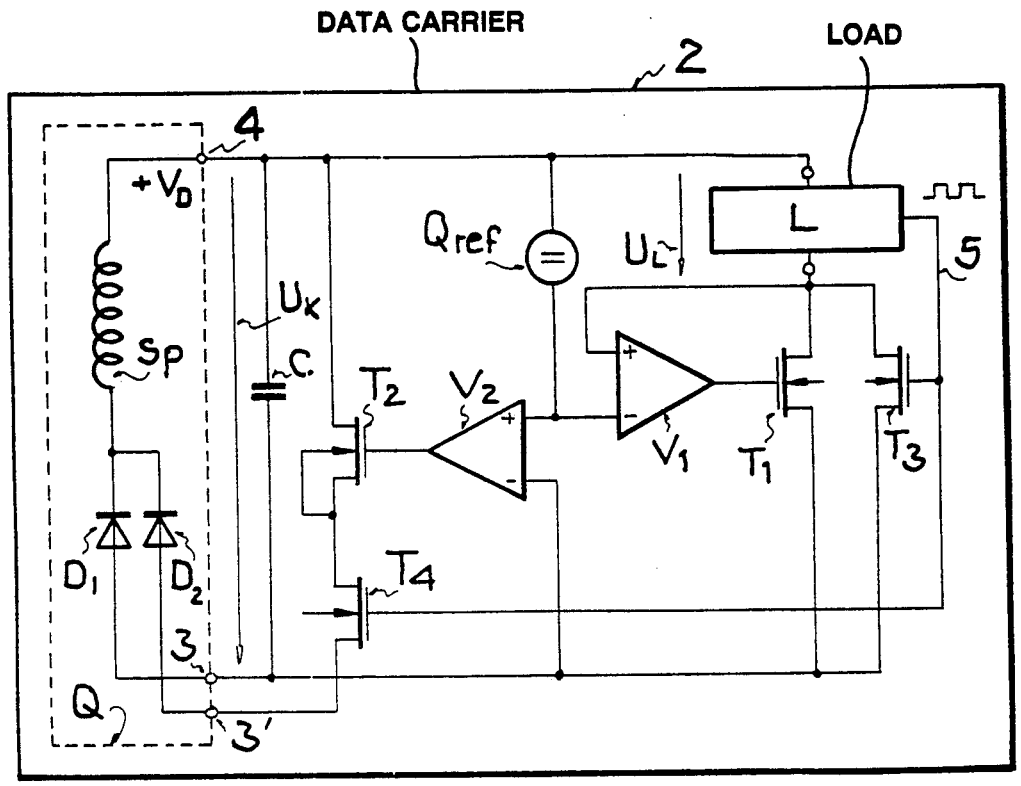
FIG. 4 is a circuit diagram of a variation of the circuit array according to FIG. 3.
Figure 5:
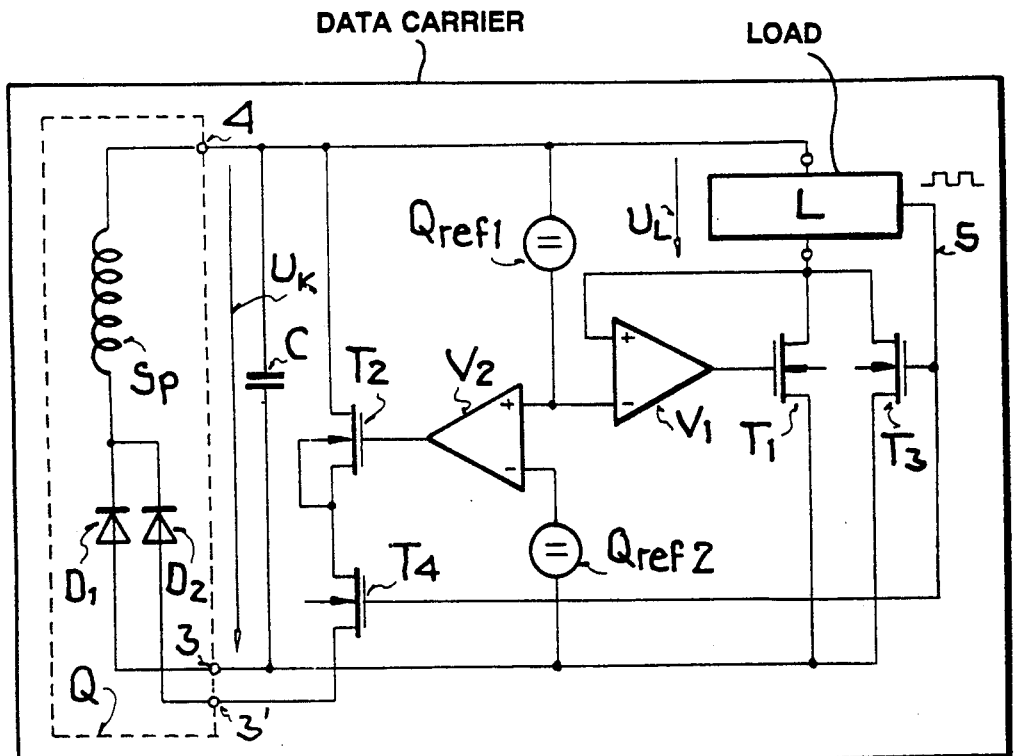
FIG. 5 is a circuit diagram of a variation of the circuit array according to FIG. 4.

The circuits according to FIGS. 4 and 5 differ from those in FIGS. 2 and 3 only in that the series circuit consisting of the parallel regulator T2 and the second switch T4 is connected not to terminals 3 and 4, but in parallel to the coil Sp via a diode D2, i.e. to terminals 3' and 4 in accordance with FIGS. 4 and 5. This achieves a certain uncoupling of the regulation circuit from the load in the sense that the edges occurring for example at high modulation frequencies do not affect the load, i.e. an integrated circuit and its function, for example. As a result, these two circuits according to FIGS. 4 and 5 can be operated with higher modulation frequencies than those shown in FIGS. 2 and 3.

In the circuits according to FIGS. 2 and 3, both the two regulators T1 and T2 and the two switches T3 and T4 are designed as n-channel field-effect transistors. In addition, the load L represents a circuit designed in integrated CMOS technology, so that the reference voltages $U_{ref}$ and $U_{ref1}$ can be selected to correspond to the sum of the threshold voltages of the p-channel and n-channel field-effect transistors in the integrated circuit. The circuits described above, designed using integrated CMOS technology, can also be operated with a different polarity of the terminal voltage $U_K$, in contrast to the conditions shown.

Finally, the circuits described above can be implemented in a data carrier, for example in an IC card or identification device, for wireless energy supply and simultaneous data transmission.

The invention described above is however not restricted to application in identification systems, but can be used to advantage for other applications. For example, the circuits described can be used in inductive proximity switches for transmission of two states, e.g. the "On" and "Off" states.

What is claimed is:

1. A method for regulating a supply voltage for a load to be fed from a voltage source, wherein said load comprises a circuit emitting one of a first logic level and a second different logic level, said method including during output of the first logic level, generating the supply voltage of said load by serial regulation; and during output of the second logic level, generating a terminal voltage of said voltage source by parallel regulation.

2. A method according to claim 1, wherein the voltage value of said terminal voltage generated by parallel regulation corresponds to the voltage value of said supply voltage generated by serial regulation.

3. A method according to claim 1, wherein the voltage value of said terminal voltage generated by parallel regulation is slightly higher than the voltage value of said supply voltage of said load generated by serial regulation.

4. A method according to claim 2, wherein the voltage value of said supply voltage of said load and the voltage value of said terminal voltage of said voltage source are adjusted both in parallel and in serial regulation to a reference voltage value.

5. A method according to claim 3, wherein the voltage value of said supply voltage of said load is adjusted to a first reference voltage value and wherein the voltage value of said terminal voltage of said voltage source is adjusted to the sum of said first reference voltage value and a second reference voltage value.

6. A circuit for regulating a supply voltage for a load to be fed from a voltage source comprising:
   said voltage source;
   said load including a circuit which emits one of a first logic level and a second logic level;
   a circuit means, connected to said voltage source and said load, and responsive to said first and second logic levels for generating a supply voltage for said load by serial regulation during output of the first logic level and for generating a terminal voltage of said voltage source by parallel regulation during output of the second logic level.

7. A circuit array according to claim 6, wherein said circuit means comprises a first series circuit including said load and a serial regulator connected in parallel to said voltage source, and with said serial regulator being actuated by an output signal of a first differential amplifier; a first switch connected in parallel to said serial regulator; a second series circuit connected to the source and including a second switch and a parallel regulator, and with said parallel regulator being actuated by an output signal of a second differential amplifier; a means for supplying the first and the second logic levels to said first and second switches to control same; a connecting circuit means for connecting at least one input of said first and second differential amplifiers to a reference voltage source.

8. A circuit array according to claim 7, wherein said voltage source is a third series circuit comprising an AC voltage source and a diode, and wherein said second series circuit comprising said parallel regulator and said second switch is connected in parallel to said AC voltage source via a further diode.

9. A circuit array according to claim 8, wherein said connecting circuit means connects said first and second differential amplifiers to said reference voltage value of said supply voltage of said load and the voltage value of said terminal voltage of said voltage source are adjusted to the voltage value of said reference voltage source.

10. A circuit array according to claim 7, wherein said connecting circuit means connects said first differential amplifier to said reference source such that the voltage value of said supply voltage of said load is adjusted to the voltage value of said reference voltage source, wherein a further reference voltage source is provided, and wherein said connecting circuit means connects said second differential amplifier to said reference voltage source and said further reference voltage source such that the voltage value of said terminal voltage of said voltage source of said terminal voltage of said voltage source is adjusted to the sum of the voltage values of said reference voltage source and said further reference voltage source.

11. A circuit array according to claim 7, wherein said load represents a circuit made in integrated CMOS technology, and wherein said serial and parallel regulators and said first and second switches are MOS field-effect transistors.

12. A circuit array according to claim 11, wherein said MOS field-effect transistors are of the n-channel type.

13. A circuit array according to claim 11, wherein the voltage value of said reference voltage source used for serial regulation corresponds approximately to the sum of the threshold voltage values of the p-channel and n-channel field-effect transistors in the load.

14. A circuit array according to claim 13, wherein said logic levels emitted by said load comprises data and said voltage source is a series connection of a coil and a diode for inductive coupling with a reader for a wireless energy supply and for wireless data transmission.

15. A circuit array according to claim 7, wherein said connecting circuit means connects said first and second differential amplifiers to said reference voltage source such that the voltage value of said supply voltage of said load and the voltage value of said terminal voltage of said voltage source are adjusted to the voltage value of said reference voltage source.

16. A circuit array according to claim 7, wherein said voltage source is a third series circuit comprising an AC voltage source and a diode, and wherein said second series circuit comprising said parallel regulator and said second switch is connected in parallel to said third series circuit.

17. A circuit array according to claim 16, wherein said connecting circuit means connects said first and second differential amplifiers to said reference voltage source such that the voltage value of said supply voltage of said load and the voltage value of said terminal voltage of said voltage source are adjusted to the voltage value of said reference voltage source.

* * * * *